United States Patent
Filmer et al.

(10) Patent No.: US 10,124,346 B2
(45) Date of Patent: Nov. 13, 2018

(54) PROCESS FOR RECOVERING VALUE METALS FROM ORE

(71) Applicant: ANGLO AMERICAN SERVICES UK LIMITED, London (GB)

(72) Inventors: Anthony Owen Filmer, Kangaroo Point (AU); Daniel John Alexander, London (GB)

(73) Assignee: ANGLO AMERICAN SERVICES (UK) LTD., London (GB)

(*) Notice: Subject to any disclaimer, the term of this patent is extended or adjusted under 35 U.S.C. 154(b) by 304 days.

(21) Appl. No.: 15/010,196

(22) Filed: Jan. 29, 2016

(65) Prior Publication Data
US 2016/0310956 A1 Oct. 27, 2016

Related U.S. Application Data

(60) Provisional application No. 62/150,920, filed on Apr. 22, 2015.

(51) Int. Cl.
*B03D 1/02* (2006.01)
*C22B 19/02* (2006.01)
(Continued)

(52) U.S. Cl.
CPC .............. *B03D 1/02* (2013.01); *C22B 1/00* (2013.01); *C22B 1/14* (2013.01); *C22B 3/04* (2013.01); *C22B 11/00* (2013.01); *C22B 11/04* (2013.01); *C22B 13/00* (2013.01); *C22B 15/0002* (2013.01); *C22B 19/02* (2013.01); *C22B 19/20* (2013.01); *C22B 23/005* (2013.01);
(Continued)

(58) Field of Classification Search
None
See application file for complete search history.

(56) References Cited

U.S. PATENT DOCUMENTS 5,034,055 A 7/1991 Rowason
2004/0115108 A1 6/2004 Hackl et al.
(Continued)

FOREIGN PATENT DOCUMENTS

CN 103816990 5/2014

OTHER PUBLICATIONS

International Search Report for PCT/IB2016/050463 dated May 23, 2016.
Written Opinion for PCT/162016/050463 dated May 23, 2016.

*Primary Examiner* — Colleen P Dunn
*Assistant Examiner* — Rajinder Bajwa
(74) *Attorney, Agent, or Firm* — Nixon Peabody LLP; Jeffrey L. Costellia

(57) ABSTRACT

This invention relates to a process for recovering valuable metals from ore with significantly reduced water consumption through the discrete treatment and storage of coarse tailings. Ore is ground to produce a coarse particulate ore. The coarse particulate ore is treated in a coarse flotation stage to produce a low grade concentrate fraction and a coarse tailings fraction. The low grade concentrate fraction is treated to produce fine tailings and a saleable concentrate. The coarse tailings are treated separately from the fine tailings and water is recovered from the coarse tailings by hydraulically stacking; filtering or screening, whereafter the coarse tailings are dry stacked, without being recombined with the fine tailings.

18 Claims, 1 Drawing Sheet

(51) Int. Cl.
  *C22B 19/20*  (2006.01)
  *C22B 3/00*  (2006.01)
  *C22B 23/00*  (2006.01)
  *C22B 1/00*  (2006.01)
  *C22B 3/04*  (2006.01)
  *C22B 1/14*  (2006.01)
  *C22B 11/00*  (2006.01)
  *C22B 13/00*  (2006.01)
  *C22B 15/00*  (2006.01)

(52) U.S. Cl.
  CPC ...... *C22B 23/0407* (2013.01); *B03D 2201/04* (2013.01); *B03D 2203/025* (2013.01); *Y02P 10/234* (2015.11)

(56) References Cited

U.S. PATENT DOCUMENTS

| | | | |
|---|---|---|---|
| 2005/0150844 A1* | 7/2005 | Hyndman | C10G 1/045 210/750 |
| 2009/0071295 A1 | 3/2009 | Gorain et al. | |
| 2009/0074607 A1 | 3/2009 | Hillier et al. | |
| 2011/0155651 A1* | 6/2011 | Gorain | B03D 1/085 209/162 |
| 2012/0318170 A1 | 12/2012 | Moffett et al. | |
| 2013/0134074 A1* | 5/2013 | Soane | C22B 3/24 209/162 |
| 2014/0044618 A1* | 2/2014 | Ostrea | B03D 1/02 423/26 |

\* cited by examiner

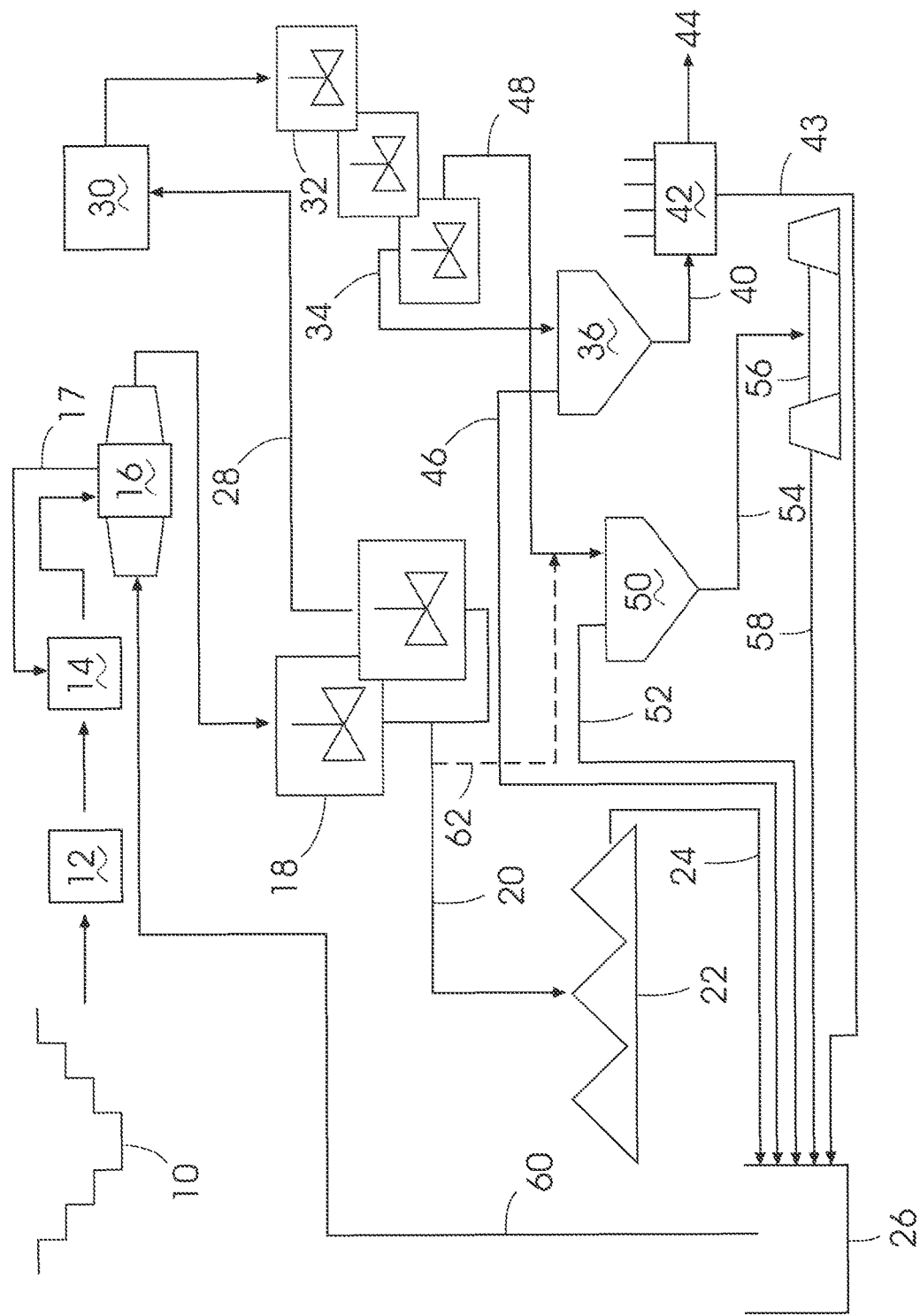

PROCESS FOR RECOVERING VALUE METALS FROM ORE

BACKGROUND TO THE INVENTION

THIS invention relates to a process for recovering valuable metals from ore.

Water and Tailings

Many mineral resources around the world are located in arid terrain where storage of wet tailings consumes excessive water. As an example, around 40% of global copper production is from the Andean desert region of Chile and Peru. As the copper mining industry has developed, the competition for water between mining, agriculture and urban activities has intensified, making permitting of new mining projects problematic. For existing operations, the lack of readily available water is being overcome by utilising ground water (a finite resource). The alternative is desalination of sea water and pumping to the mine site (often located far from the coast or at altitudes in excess of 3000 m). The desalinated water may be sustainable source, but it is a very expensive. Hence access to the mineral endowment in the area is constrained by water.

Similarly, many of the world's gold and copper deposits are in areas where the local terrain and seismic activity makes perpetual storage of large quantities of tailing very problematic.

Given the mountainous terrain, the impoundment of fine tailings for many mines is also difficult. Tailings dams are often located in steep valleys requiring very high dam walls, in areas which have the potential for major earthquakes. Thus, the risk of dam failure, and substantive environmental damage associated with large volumes of fine slurry flowing many kilometers downstream, is ever present. This significant risk is mitigated through highly engineered and regulated tailings impoundment facilities. As such, storage of tailings is often the most expensive part of the overall capital for a new mine.

Using traditional processing and tailings disposal, the tailings storage facility (TSF) also represents the primary sink (up to 80%) for water consumed within the mining process. The hydrophilic nature of fine tailings makes solid/liquid separation expensive through mechanical or chemical means and the fine tailings can contain 0.6-0.7 tonne water per tonne of tailings. The high water content makes the stored material subject to liquefaction in the event of any breach of the dam. Thus, any technique which can minimise the quantity of fine tailings generated will have a major impact on the capital cost of a mining a copper, gold, or mixed copper gold, mineral resource, and a direct effect on the quantity of water required.

With this in mind, some operations cyclone their tailings, to separate around 10-60% of the material as a sand fraction, typically of diameter greater than 100 micron. The sand fraction drains more easily at progressively larger particle sizes, such that water can be partially recovered for recycling by either filtration, screening, or natural drainage from stacking. Typically the remaining fine tailings will have a water content of 65% by weight, whereas on drainage, the fine ±100 micron sand will retain 20-30% by weight water. The sand fraction can be hydraulically stacked; or filtered or screened, and dry stacked. In some cases the sand can be used as part of the TSF dam wall, or else it is stacked separately. The sand fraction not only has a lower moisture content, its larger particle size make it more resistant to liquefaction in the event of an earthquake.

There are also a few small operations which filter all of their conventional flotation tailings for dry stacking, due to specific constraints on tailings storage associated with their location. However, these operations are rare, due to the high cost of filtration of fine tailings material.

Flotation

Flotation has traditionally been used to separate a variety of valuable minerals containing metals such as copper, gold, nickel, platinum group metals, lead, zinc, phosphates, and iron; from the gangue fraction of the ore. The flotation technology creates the conditions for the attachment of an air bubble to a fraction of a finely ground feed, to float one fraction or the other and separate a high grade concentrate from the relatively barren tailings. For example, porphyry ores are typically ground to a diameter of around 50-250 microns to almost fully liberate the copper sulphide mineral particles, and then floated to recover around 90% of the copper as concentrate containing around 25-35% copper.

The processing (crushing, fine grinding and flotation) of such ores has both a high capital cost and high energy consumption. This high cost (around 40% of total cost of a mining and processing operation); dictates in part the cut-off grade of ores which are economic to mine. For this reason, companies have investigated other techniques for physical separation of ore into high grade and low grade streams, prior to grinding to fully liberate the valuable minerals. These physical separation techniques fall under the generic title of pre-concentration, and variously include selective mining, size separation, density separation, or mechanical sorting. Where successful, this upgrading allows either increased overall production through the processing assets, or reduction in the unit cost of processing by reducing the energy required to liberate the valuable mineral. Where pre-concentration is undertaken at a coarse size, the effect is to reduce the material that is ground to a fine size, and hence also reduce the volume requiring special storage as tailings. However, the low selectivity of such pre-concentration techniques usually results in a relatively low recovery of the total resource mined.

Whilst flotation has been used for many years to separate fully liberated ores, coarse flotation of partially liberated ore has not been considered as a viable technology until recently. This is partly due to the difficulty in floating coarse particles, given their tendency to detach from the flotation bubbles, particularly in a highly agitated flotation cell, or through the froth layer designed to improve grades. There is also a trade-off between recovery and grade; i.e. where the valuable particles are only partially liberated from the gangue, flotation does not directly yield both a high recovery and a saleable grade. Regrinding of the material is required to generate a satisfactory concentrate grade.

Recently, some proponents of coarse flotation have been examining opportunities to float at a coarser size fraction for a variety of minerals (Improving the recovery of low grade coarse composite particles in porphyry copper ores Saeed Farrokhpay, Igor Ametov, Stephen Grano Advanced Powder technology 22 (2011) 464-470; Coarse gold recovery using flotation in a fluidized bed; Julio Jairo Carmona Franco, Maria Fernanda Castillo, Jose Concha, Lance Christodoulou & Eric Wasmund, 47th Annual Canadian Mineral Processors Operators Conference, Ottawa, Ontario, Jan. 20-22, 2015; Jameson, G. J., 2010, "New directions in flotation machine design", Minerals Engineering, Volume 23, pp 835 841; Flotation technology for coarse and fine particle recovery; Eric Bain Wasmund I Congreso internacional de flotacion de minerales, Lima, Peru, August 2014; Flotacion de finos y gruesos aplicada a la recuperacion de minerales de cobre; J.

Concha, E. Wasmund). The contents of these documents are incorporated herein by reference. The concept produces an initially low grade concentrate by floating most of the composite particles, and then to mill this low grade concentrate to allow it to be re-floated to form a readily saleable concentrate. The benefits of coarse flotation claimed by the proponents is a reduction in total energy consumed in milling. The residues from both the low grade and saleable flotation circuits as proposed, are sent to a common tailings storage. Thus, the consumption of water and amount of tailings slurry to be stored after this coarse flotation remains the same as for conventional flotation, albeit that the particle size distribution in the tailings would be somewhat coarser.

Coarse flotation has typically targeted a grind to a particle diameter of above 150 microns. The aim is to minimise total cost by reducing grinding energy, and hence the balance between pre-grinding to get a high overall recovery; and the limited mass pull to deliver the reduced energy consumption in fine grinding.

Specific flotation machines have been designed to improve this recovery of coarse mineral particles, including those particles which are not fully liberated from the gangue. These coarse flotation machines typically operate with air sparging in a fluidised bed arrangement, and have a thin or no froth layer to minimise the detachment of target mineral particles as they reach the product layer. Tailings produced from such a coarse and subsequent fine grinding system are a mix of the barren material from coarse flotation, and the barren material from the regrind and re-float.

Despite commercial designs being available for such specific flotation machines, the commercial application has been limited, presumably because the gains in energy efficiency are offset by other factors such as a slight loss in overall recovery. Importantly, in the configurations currently proposed, there are no significant gains achieved in water consumption or tailings storage requirements.

It is an object of the present invention to provide an improved process for recovering valuable metals that results in reduced water consumption and tailings storage requirements.

SUMMARY OF THE INVENTION

According to the invention there is provided a process for recovering value metals (such as copper, lead, zinc, silver, platinum, gold or nickel) from ore with significantly reduced water consumption through the discrete treatment and storage of coarse tailings; including the steps of:

grinding the ore to produce a coarse particulate ore with a particle size where exposure of the valuable mineral enables flotation of most of the mineralized values. This is typically a p80 greater than 150 µm up to 1000 µm, typically 200 µm, preferably 250 µm up to 800 µm, most preferably between 300 µm up to 600 µm;

treating the coarse particulate ore in a coarse flotation stage to produce a low grade concentrate fraction and a coarse tailings fraction; wherein: the coarse tailings is treated separately from the fine tailings produced when the low grade concentrate is reground to produce a saleable concentrate; and water is recovered from the coarse tailings by hydraulically stacking, filtering or screening; whereafter:

the coarse tailings are dry stacked, without being recombined with the fine tailings (or other fine tailings such as fine-grained waste stream or other waste waters), nor passed through a concentrator. By "concentrator" is meant the conventional process of further grinding, along with rest of the ore, to a finer size to liberate the mineralized ore sufficiently to form a concentrate of a grade suitable for sale or chemical processing.

Fine tailings have a particle size p80 of less than 150 µm, typically 10 to 100 µm.

Preferably, water recovered from the hydraulic stacking, filtration or screening is recycled in the process, or disposed of in a sustainable manner.

The ore may contain Cu (copper) sulphide, or Pb (lead), Zn (zinc) and Ag (silver) sulphides, or precious metal sulphides such as Pt (platinum) and Au (gold), or Ni (nickel) sulphide.

Depending on both the particular ore type, and the mineralogy of the particular minerals and gangue contained therein, the optimum particle size for coarse flotation and subsequent dry stacking, and the mass pull required to achieve the desired recoveries, may vary. However, the underlying principles for the invention remain consistent for all ore types.

Typically, the coarse flotation stage is operated to achieve a recovery of 70-90%, preferably 80-90%, into a mass pull of 15 to 25%, preferably about 20% of the ore, to produce coarse tailings comprising more than 70%, preferably 80% or more by mass of the ore, and the concentrate comprising less than 30%, preferably 20% or less by mass of the ore. The fine tailings fraction may comprise less than 30%, typically less than 20% by mass of the ore.

The coarse flotation stage may include a secondary recovery step in which a middlings fraction is floated to increase total recovery of the valuable mineral, either through percolation leaching, gravity process or further milling and flotation in a conventional manner.

In this embodiment of the invention, the coarse flotation stage may be operated to achieve a recovery of 90-95% into a mass pull of 35 to 45%, preferably about 40%, of the ore, produce coarse tailings comprising at least 55%, preferably 60% or more by mass of the ore, a middlings fraction comprising 25%, preferably 30% or more by mass of the ore, and a concentrate comprising 15% or less, preferably 10% or less by mass of the ore. The fine tailings fraction may comprise less than 15%, typically less than 10% by mass of the ore.

The middlings fraction may be:
a) subjected to percolation leaching to recover a proportion of the contained values;
b) subjected to a gravity process to recover a proportion of the contained values; or
c) or stored separately for reprocessing later in the mine life to optimise the overall mine production profile.

Water recovered from the concentrate thickener is preferably recycled in the process.

Typically, fine tailings from the secondary flotation stage are sent to a concentrator; water recovered from the concentrator is recycled in the process; and tailings from the concentrator are stored in a tailings facility, from which further water may be recovered and recycled in the process.

The overall water loss in the system may be about 0.3 t/t or less of ore processed.

DRAWING

FIG. 1 is a flow diagram of a process according to the present invention for recovering value metals from ore.

DETAILED DESCRIPTION OF INVENTION

THIS invention relates to a process for recovering valuable metals from ore, in particular to a process for reducing water consumption and tailings storage capacity required by using coarse particle recovery in combination with dry storage of coarse tailings.

In accordance with the present invention, liberated gangue minerals are rejected at a coarser size than current flotation practices, while maintaining the recovery of valuable minerals to the overall concentrate and in the process to separately treat the coarse tailings to reduce the water, energy and wet fine tailings treatment requirements per ton of ore treated (i.e. reduce the water, energy and tailings intensity). Normal flotation process makes use of grinding size reduction circuits to liberate the valuable minerals for effective flotation to produce a saleable grade of concentrate, while the coarse particle recovery invention requires partially exposed ores significantly increasing the required grinding P80. This reduces the amount of energy required for ore liberation. Coarse particle recovery reduces the amount of gangue material fed to the conventional production circuit, liberating plant capacity and reducing the water requirement per tonne of treated material through the flotation process. When treated separately the waste generated from the coarse particle flotation process can be readily be hydraulically or dry stacked and 60-90% of the entrained water recovered and returned to the process water circuit, greatly reducing the water consumption in the extraction process. Rejection of waste material by means of coarse particle flotation reduces the amount of waste ultimately sent to the tailings dam per tonne of produced saleable concentrate. The process of the present invention can be applied to existing and retrofit operations, brownfield and greenfield projects in the field of flotation concentration and pre-concentration of ore.

The subject of this invention is to utilise coarse flotation in conjunction with separate sand disposal (hydraulic or dry stacking) or storage of the gangue fraction from coarse flotation; in an integrated system configured to considerably enhance recoveries relative to pre-concentration technique, optimise the volume of the tailings storage facility, and reduce the quantity of water consumed per unit of mineral concentrate produced. It will focus on rejecting coarse liberated gangue material and remove them from the process quickly, before they consume water, energy and tailings capacity.

Without the recognition that coarse flotation provides an opportunity to store the barren tailings material separately, the coarse flotation technique may improve energy consumption as its proponents claim, but will have little impact on tailings storage capacity and water consumption. However, combined with the ability to store sand separately from the fine slurries, coarse flotation opens up the potential to dramatically change the amount of tailings requiring storage in a purpose built dam to contain slurry, but also allows a different production profile from a given ore body within the constraints of available water.

The optimum grind size to partially liberate most of the valuable mineral particles will be specific for each ore. However, typically, most sulphide minerals in a copper ore will be at least partially exposed at grind sizes between 150 and 1000 micron, they can be successfully floated in the appropriate flotation machine. More importantly, there is significant 100% barren gangue material at these sizes (>50% in most cases) that can be removed from the process quickly. These barren tailings from this coarse flotation stage are of a size where dewatering can be readily achieved in a separate process stream from the very fine waste created in the ultimate production of a saleable concentrate; and can be readily sent to an alternative disposal location and placed using a different method. This disposal might, for example, be hydraulic stacking; or filtration and dry stacking, neither of which requires purpose highly engineered tailings containment facility. The effective drainage that can be achieved from coarse sand, results in immediate and significantly increased water recovery, relative to the very difficult processes associated with minimising water loss in a conventional tailings facility.

Depending on the mineralogy of the feed, and the mass pull that is used in the coarse flotation to achieve an acceptable tailings grade, it is anticipated that material sent to the fine grinding circuit is reduced by some 50-95%.

The tailings fraction from the coarse flotation process, at a size of >150 micron up to around, 1 mm, is ideal for stacking in an open environment over an extended period, or for reuse in other industries. The sand is not easily transported by wind, and does not require any specific impoundment, other than that required to collect precipitation run-off. It will not be subject to liquefaction in the event of an earthquake. It has minimal exposed sulphide minerals, and hence will not have a strong tendency to oxidise and produce acid mine drainage. The sand is of an ideal size where it can be disposed of in many ways; for example either stored separately or in combination with waste rock disposal, or stored for later recovery and retreatment, or used for road and other civil construction in the mining operation, or sold as a sand to be used as fill for landscaping or as an input for the manufacture of concrete.

Thus, by separately storing the coarse sand early in the flotation process, the tailings capacity required to handle the fine gangue generated in the regrind/refloat is reduced to between 5-50% of the quantity per tonne of ore mined when compared to that in traditional processing or within the coarse flotation processes proposed in the literature. Furthermore, by arranging the coarse flotation cells appropriately, the highest grade coarse concentrate can be recovered in the initial (rougher) flotation cells. In a secondary recovery step (scavenging) a middlings fraction can be floated in further flotation cells arranged in series to further process the tailings from the initial flotation, leaving an almost barren material for disposal. The middlings material from the scavenging cell will be of lower grade than the rougher, but still worthy of further treatment to recover the copper. This arrangement of the float cells can produce very high grade material for regrind in the initial stages of mine life; and a middlings fraction that may be of somewhat lower grade than the original ore, but above the cut-off grade for processing at which it is no longer economic to recover the contained mineral value.

The middlings material is in a form which can be separately stacked for reclaiming and treatment much later in the mine life, albeit that it may need to be managed to reduce the level of acid mine drainage. Alternatively, for copper and gold as an example, the material is of an ideal size and permeability for percolation leaching to oxidise and recover the exposed minerals.

By using such a combination of rougher and scavenger cells and associated storage of the middlings, the mass pull that is ultimately directed to fine grinding can be higher or lower overall, than that proposed by the proponents of coarse flotation, which has been conceptually designed to optimise energy consumption. This multi-product approach based on the combination of coarse flotation and dry stacking of the coarse tailings, offers considerable flexibility in the design of the overall mine, processing and waste storage system, depending on each particular mining operations' greatest constraint:

Optimise the consumption of water and fine tailings storage capacity (particularly in early mine life) by minimising the rougher mass pull and only fine grinding very high grade material in the first instance; whilst ultimately maintaining an acceptable overall recovery by storing the middlings concentrate.

Optimise the dewatering and storage/sale of sand, or preparation of the coarse tailings for percolation leaching, or treatment by gravity processes, by selecting the preferred grind size for further processing to form the feed to the coarse flotation.

Optimise the overall economic mineral recovery, by decreasing the cut-off grade for mining to increase the overall mineable resource, treating this larger resource by coarse flotation, and increasing the mass pull in the scavenger circuit to produce a middlings fraction, yielding an improved economic recovery of the mineralised resource, within the constraints of water, tailings storage and energy costs.

Optimise the throughput of installed mineral processing facilities, and water availability and tailings storage facilities, by processing a coarse fraction of the existing milling system flow, to reject a fraction of barren sand from the milling circuit With reference to the drawing, in an embodiment of the invention, ore from a mine 10 is crushed into coarse particles in stages 12 and 14. The coarse crushed particles are sent to a mill and size selector unit 16 which selects particles in the desired size range of size of 150-650 µm, and thereafter to a coarse particle flotation circuit 18. Oversize particles 17 from the size selctor unit 16 are returned to the crushing stage 14. The coarse particle flotation circuit 18 is operated to achieve a recovery of 80-90% into a mass pull of about 20% of the ore, produce a coarse tailings fraction 20 comprising 80% or more by mass of the ore and a concentrate 28 comprising 20% or less by mass of the ore. A suitable flotation cell is the Eriez Hydrofloat™, which carries out the concentration process based on a combination of fluidization and flotation using fluidization water which has been aerated with micro-bubbles of air. The flotation is carried out using a suitable activator and collector concentrations and residence time, for the particular mineral to be floated.

The tailings fraction 20 from the coarse particle flotation circuit 18 is sent to sand disposal (hydraulic or dry stacking) or storage 22. Water 24 is collected from the sand disposal (hydraulic or dry stacking) or storage 22 and stored in a reservoir 26.

The concentrate 28 from the coarse flotation cell 18 is sent to a to a mill 30 where it is milled to liberate the valuable mineral to produce a saleable concentrate grade in the subsequent secondary flotation steps 32. Concentrate 34 from the flotation steps 32 is sent to a concentrate thickener 36. Thickened concentrate 40 from the concentrate thickener 36 is passed through a concentrate filter 42, from which a concentrate product 44 is shipped to the customer. Water 43 from the concentrate filter 42 is sent to the reservoir 26. Water 46 from the concentrate thickener 36 is sent to the reservoir 26.

Tailings 48 from the flotation steps 32 are sent to a tailings thickener 50. Water 52 from the tailings thickener 50 is sent to the reservoir 26. Tailings 54 from the tailings thickener 50 are sent to a tailings facility 56 for storage, and water 58 from this facility is sent to the reservoir 26.

Process water 60 in the reservoir 26, recovered from the process, is recycled to the selector unit 16. This recycle delivers significant water recovery enhancement and reduced tailing pond requirement. The overall water loss in the system may be about 0.3 t/t or less of ore processed.

In an embodiment of the invention, in the coarse particle flotation circuit 18, coarse flotation cells are arranged in such a manner that highest grade coarse concentrate is recovered in the initial (rougher) flotation cells, and a secondary recovery step (scavenging) a middlings fraction is floated in further flotation cells arranged in series to further process the tailings 20 from the initial flotation, leaving an almost barren material for disposal. The middlings material from the scavenging cell may be:

d) subjected to percolation leaching to recover a proportion of the contained values;
e) subjected to a gravity process to recover a proportion of the contained values; or
f) or stored separately for reprocessing later in the mine life at a time to optimise the overall mine production profile.

In this embodiment of the invention, the coarse flotation circuit 18 may be operated to achieve a recovery of 90-95% into a mass pull of about 40% of the ore, produce a coarse tailings fraction 20 comprising 60% or more by mass of the ore, a middlings fraction comprising 30% or more by mass of the ore, and a concentrate 28 comprising 10% or less by mass of the ore.

In a further embodiment of the invention, the middlings material from the scavenging cells may be sent to the mill 32 and subjected to secondary flotation steps 36.

The dashed line 62 indicates the movement of tailings from a coarse flotation cell 18 using existing technology. The tailings 62 go to the tailings thickener 50 where they are mixed with finely milled tailings, and sent to the tailings facility 56.

EXAMPLES

The invention will now be described in more detail with reference to the following examples.

Example 1—Comparative

As a comparative example, a conventional mine might have a head-grade of 0.6% copper, and each tonne of ore would be ground to a p80 of 125 µm. Recovery in flotation will be 80-95% at a grade of 25-30% copper, leaving 99% of the ore as a fine residue to be managed in the tailings storage facility. The contained water in this will be 0.6 tonne/tonne (t/t) of ore processed.

Example 2

Using the process of the present invention, the same ore can be ground to a p80 of 500 µm. Recovery of the initial concentrate from coarse flotation will indicatively be 80-90% into a mass pull of 20% of the ore. The remaining sand (80% of the ore mass) will be stacked separately, with water loss in this fraction of 0.2 t/t residue. This will leave 20% of the mass in the low grade concentrate to proceed to fine grinding. Copper recovery at this flotation stage will be 95%, leaving a residue of 20% of the original ore to be stored in the tailings storage facility with contained water at 0.6 t/t residue. Thus the overall water loss in the system will be around 0.3 t/t of ore processed. Thus the invention in this form has halved the water consumed, and reduced the tailings quantity by 80%. The loss of copper recovery of 5-15% from the original ore, can be accommodated by increasing mining and processing rate by an additional 10-15%.

Example 3

Using the process of the present invention, the mass pull in coarse flotation can be increased to 40% by including a scavenging circuit, but with separate storage of the middlings. Given the higher mass pull, the recovery of copper from the original ore will increase to 85-95%. A higher grade of concentrate can be recovered from the roughers (say around 5% Cu) at 10% of the original mass. This feed to fine grinding will contain 75% of the copper in the original ore, thus reducing the initial tailings production to just 10% of the mined ore. Water consumption is reduced to just 40% of normal operation. The middlings fraction recovered from the scavengers will account for say 30% of the original ore at a grade of 0.3% copper. This middlings material is at a grade where it can either be fine milled at the end of mine life, or percolation leached.

In summary, coarse flotation used in a system together with the storage of recovered barren sand can offer: an improved usage efficiency of capital intensive tailings capacity; a lower overall operating cost per product tonne by reducing the need for fine milling; a higher recovery of the mineral resource by reducing the cut-off grade that can be economically mined; and a more water efficient mine. The optimisation of the combined system will be specific to a particular operation driven by a function of the resource size and grade, the location with associated water and tailings constraints, and the business strategy for balancing immediate return on invested capital vs long term operating competitive position.

The invention claimed is:

1. A process for recovering value metals from ore, including the steps of:
grinding the ore to produce a coarse particulate ore with a particle size p80 of greater than 150 μm up to 1000 μm, and selecting particles in the size range of 150-650 μm;
treating the coarse particulate ore in a coarse flotation stage to produce a concentrate fraction, and a coarse tailings fraction; and
milling the concentrate fraction to produce a milled concentrate, and treating the milled concentrate in a secondary flotation stage to produce a secondary concentrate fraction and a fine tailings fraction that has a particle size p80 of less than 150 μm; wherein:
coarse tailings from the coarse tailings fraction are treated or stored separately from the fine tailings fraction or any other fine tailings, and wherein water is removed from the coarse tailings fraction by hydraulically stacking, filtering or screening, and the coarse tailings fraction is then dry stacked.

2. The process claimed in claim 1, wherein the coarse tailings from the coarse tailings fraction are not combined with fine tailings, nor passed through a concentrator.

3. The process claimed in claim 1, wherein the fine tailings has a particle size of 10 μm to 100 μm.

4. The process claimed in claim 1, wherein water recovered from the hydraulic stacking, filtration or screening is recycled.

5. The process claimed in claim 1, wherein the ore contains:
Cu (copper) sulphide; or
Pb (lead), Zn (zinc) and Ag (silver) sulphides; or
precious metal sulphides including Pt (platinum) and Au (gold);
or Ni (nickel) sulphide.

6. The process claimed in claim 1, wherein the coarse tailings fraction comprises more than 70% by mass of the ore, and the concentrate comprises less than 30% by mass of the ore.

7. The process claimed in claim 6, wherein the fine tailings fraction comprises less than 30% by mass of the ore.

8. The process claimed in claim 6, wherein the coarse tailings fraction comprises 80% or more by mass of the ore, and the concentrate comprises 20% or less by mass of the ore.

9. The process claimed in claim 8, wherein the ore contains:
wherein the fine tailings fraction comprises less than 20% by mass of the ore.

10. The process claimed in claim 1, wherein the coarse flotation stage includes a secondary recovery step in which a middlings fraction is floated.

11. The process claimed in claim 10, wherein the fine tailings fraction comprises less than 15% by mass of the ore.

12. The process claimed in claim 10, wherein the coarse floatation stage is operated to achieve a recovery of about 95%, produce coarse tailing comprising 60% or more by mass of the ore, a middlings fraction comprising 30% or more by mass of the ore, and a secondary concentrate comprising 10% or less by mass of the ore.

13. The process claimed in claim 12, wherein the fine tailings fraction comprises less than 10% by mass of the ore.

14. The process claimed in claim 10, wherein the middling fraction is:
a) subjected to percolation leaching to recover a proportion of the contained values;
b) subjected to a gravity process to recover a proportion of the contained values; or
c) stored.

15. The process claimed in claim 1, wherein the secondary concentrate fraction is sent to a concentrate thickener.

16. The process claimed in claim 15, wherein water recovered from the concentrate thickener is recycled.

17. The process claimed in claim 15, wherein:
fine tailings from the secondary flotation stage are sent to a concentrator;
water recovered from the concentrator is recycled; and
tailings from the concentrator are stored in a fine tailings facility, from which water is recycled.

18. The process claimed in claim 1, wherein overall water loss in the process is 0.3 t/t or less of ore processed.

* * * * *

(12) SUPPLEMENTAL EXAMINATION CERTIFICATE

United States Patent
Filmer et al.

(10) Number: US 10,124,346 F1
(45) Certificate Issued: Jan. 5, 2024

Control No.: 96/050,018

Filing Date: Dec. 6, 2023

Primary Examiner: Carlos Lopez

No substantial new question of patentability is raised in the request for supplemental examination. See the Reasons for Substantial New Question of Patentability Determination in the file of this proceeding.

(56) Items of Information

OTHER DOCUMENTS

Awatey et al., "Incorporating fluidised-bed flotation into a conventional flotation flowsheet: A focus on energy implications of coarse particle recovery," Powder Technology, Volume 275, pages 85-93, May 2015.